US010564987B1

(12) United States Patent
Lépine et al.

(10) Patent No.: US 10,564,987 B1
(45) Date of Patent: Feb. 18, 2020

(54) EFFICIENT INFRASTRUCTURE UPDATES FOR EXECUTABLE CODE DEVELOPMENT

(71) Applicant: Amazon Technologies, Inc., Seattle, WA (US)

(72) Inventors: Julien D. Lépine, Mériel (FR); Damián Arregui Melmann, Paris (FR); Saurabh Shrivastava, Snohomish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 180 days.

(21) Appl. No.: 15/634,930

(22) Filed: Jun. 27, 2017

(51) Int. Cl.
*G06F 9/445* (2018.01)
*G06F 8/65* (2018.01)

(52) U.S. Cl.
CPC .......... *G06F 9/44505* (2013.01); *G06F 8/65* (2013.01)

(58) Field of Classification Search
CPC ............................ G06F 8/65; G06F 9/44505
USPC ................................................ 717/168–178
See application file for complete search history.

(56) References Cited

U.S. PATENT DOCUMENTS

| | | | | |
|---|---|---|---|---|
| 9,032,410 B1* | 5/2015 | Kumpera | ............... | G06F 9/485 |
| | | | | 718/102 |
| 9,871,697 B2* | 1/2018 | Stefansson | ......... | G06F 9/44505 |
| 2011/0231813 A1* | 9/2011 | Seo | ........................... | G06F 8/30 |
| | | | | 717/106 |
| 2016/0055081 A1* | 2/2016 | Kumpera | ............... | G06F 9/485 |
| | | | | 717/120 |
| 2017/0123831 A1* | 5/2017 | Byard | ................ | G06F 9/45558 |
| 2018/0150318 A1* | 5/2018 | Kuo | ...................... | G06F 9/4818 |

OTHER PUBLICATIONS

Merkle, J., and M. Lochter, "Elliptic Curve Cryptography (ECC) Brainpool Curves for Transport Layer Security (TLS)," Request for Comments: 7027, Informational, Oct. 2013, 11 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.
"AWS CloudFormation," © 2018, Amazon Web Services, Inc., <https://aws.amazon.com/cloudformation/> [accessed May 7, 2018], 5 pages.
"Log-Structured File System," Wikipedia, edited Jun. 2017, <https://en.wikipedia.org/wiki/Log-structured_file_system> [accessed May 7, 2018], 2 pages.
Atkinson, R., "Security Architecture for the Internet Protocol," Request for Comments: 1825, Standards Track, Aug. 1995, 23 pages.

(Continued)

*Primary Examiner* — Marina Lee
(74) *Attorney, Agent, or Firm* — Davis Wright Tremain LLP

(57) ABSTRACT

A system, such as a system of a computing resource service provider, tracks infrastructure-level changes to execution environments caused by or otherwise associated with activity associated with executable code. In one embodiment, the activity is associated with development and/or testing of the executable code, and a monitoring service generates a log of changes to the associated infrastructure caused by the activity over a designated period of time. The log of changes is used to generate a template that in turn causes configuration of a target execution environment in accordance with the monitored changes.

20 Claims, 8 Drawing Sheets

(56) References Cited

OTHER PUBLICATIONS

Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
Metzger, P., et al., "IP Authentication Using Keyed MD5," Request for Comments: 1828, Standards Track, Aug. 1995, 6 pages.
Karn, P., et al., "The ESP DES-CBC Transform," Request for Comments: 1829, Standards Track, Aug. 1995, 11 pages.
Dierks, T., et al., "The TLS Protocol Version 1.0," Request for Comments: 2246, Standards Track, Jan. 1999, 75 pages.
Kent, S., and R. Atkinson, "Security Architecture for the Internet Protocol," Request for Comments: 2401, Standards Track, Nov. 1998, 62 pages.
Orman, H., "The OAKLEY Key Determination Protocol," Request for Comments: 2412, Informational, Nov. 1998, 56 pages.
Newman, C., "Using TLS with IMAP, POP3 and ACAP," Request for Comments: 2595, Standards Track, Jun. 1999, 16 pages.
Medvinsky, A., et al., "Addition of Kerberos Cipher Suites to Transport Layer Security (TLS)," Request for Comments: 2712, Standards Track, Oct. 1999, 7 pages.
Khare, R., et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 8 pages.
Hoffman, P., "SMTP Service Extension for Secure SMTP over Transport Layer Security," Request for Comments: 3207, Standards Track, Feb. 2002, 9 pages.
Chown, P., "Advanced Encryption Standard (AES) Ciphersuites for Transport Layer Security (TLS)," Request for Comments: 3268, Standards Track, Jun. 2002, 8 pages.
Blake-Wilson, S., et al., "Transport Layer Security (TLS) Extensions," Request for Comments: 3546, Standards Track, Jun. 2003, 28 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.
Moriai, S., et al., "Addition of Camellia Cipher Suites to Transport Layer Security (TLS)," Request for Comments: 4132, Standards Track, Jul. 2005, 8 pages.
Lee, H.J., et al., "Addition of Seed Cipher Suites to Transport Layer Security (TLS)," Request for Comments: 4162, Standards Track, Aug. 2005, 7 pages.
Ford-Hutchinson, P., "Securing FTP with TLS," Request for Comments: 4217, Standards Track, Oct. 2005, 29 pages.
Eronen, P., and H. Tschofenig, "Pre-Shared Key Ciphersuites for Transport Layer Security (TLS)," Request for Comments: 4279, Standards Track, Dec. 2005, 16 pages.
Kent, S., and K. Seo, "Security Architecture for the Internet Protocol," Request for Comments: 4301, Standards Track, Dec. 2005, 102 pages.
Kent, S., "IP Encapsulating Security Payload (ESP)," Request for Comments: 4303, Standards Track, Dec. 2005, 45 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Rescorla, E., and N. Modadugu, "Datagram Transport Layer Security," Request for Comments: 4347, Standards Track, Apr. 2006, 26 pages.
Blake-Wilson, S., et al., "Transport Layer Security (TLS) Extensions," Request for Comments: 4366, Standards Track, Apr. 2006, 29 pages.
Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.
Dierks, T., and E. Rescorla, "The Transport Layer Security (TLS) Protocol Version 1.2," Request for Comments: 5246, Standards Track, Aug. 2008, 98 pages.
Salowey, J., et al., "AES Galois Counter Mode (GCM) Cipher Suites for TLS," Request for Comments: 5288, Standards Track, Aug. 2008, 9 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Rescorla, E., et al., "Transport Layer Security (TLS) Renegotiation Indication Extension," Request for Comments: 5746, Standards Track, Feb. 2010, 16 pages.
McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Eastlake, D., "Transport Layer Security (TLS) Extensions: Extension Definitions," Request for Comments: 6066, Standards Track, Jan. 2011, 25 pages.
Tuexen, M., et al., "Datagram Transport Layer Security (DTLS) for Stream Control Transmission Protocol (SCTP)," Request for Comments: 6083, Standards Track, Jan. 2011, 10 pages.
Mavrogiannopoulos, N., and D. Gillmor, "Using OpenPGP Keys for Transport Layer Security (TLS) Authentication," Request for Comments: 6091, Informational, Feb. 2011, 9 pages.
Turner, S., and T. Polk, "Prohibiting Secure Sockets Layer (SSL) Version 2.0," Request for Comments: 6176, Standards Track, Mar. 2011, 4 pages.
Kim, W., et al., "Addition of the ARIA Cipher Suites to Transport Layer Security (TLS)," Request for Comments: 6209, Informational, Apr. 2011, 10 pages.
Rescorla, E., and N. Modadugu, "Datagram Transport Layer Security Version 1.2," Request for Comments: 6347, Standards Track, Jan. 2012, 33 pages.
Kanno, S., and M. Kanda, "Addition of the Camellia Cipher Suites to Transport Layer Security (TLS)," Request for Comments: 6367, Informational, Sep. 2011, 9 pages.
Salter, M., and R. Housley, "Suite B Profile for Transport Layer Security (TLS)," Request for Comments: 6460, Informational, Jan. 2012, 15 pages.
McGrew, D., and D. Bailey, "AES-CCM Cipher Suites for Transport Layer Security (TLS)," Request for Comments: 6655, Standards Track, Jul. 2012, 8 pages.

\* cited by examiner

EFFICIENT INFRASTRUCTURE UPDATES FOR EXECUTABLE CODE DEVELOPMENT

BACKGROUND

As application complexity and associated computational demands continue to increase over time, various techniques have been developed to improve computational efficiency, such as distributed processing, parallelization, and on-demand virtualization of various computational resources. One of the many benefits of distributed computing, and particularly virtualized computing, is the ability to control, define, and modify the capabilities and functionality of deployed resources according to the demands for those resources.

However, the additional flexibility provided by such distributed systems often comes at the cost of additional complexity from the perspective of application development. For example, deployment of code updates that imply, prefer, or necessitate a change in the underlying infrastructure upon which the code is intended to operate, often occurs first in an environment under control of the developer. However, the infrastructure associated with the developer's test environment, and changes to that environment caused by the code deployment, may not necessarily correlate with the production deployment structure on which the code will eventually operate.

BRIEF DESCRIPTION OF THE DRAWINGS

Various techniques will be described with reference to the drawings, in which.

DETAILED DESCRIPTION

Figure 1:
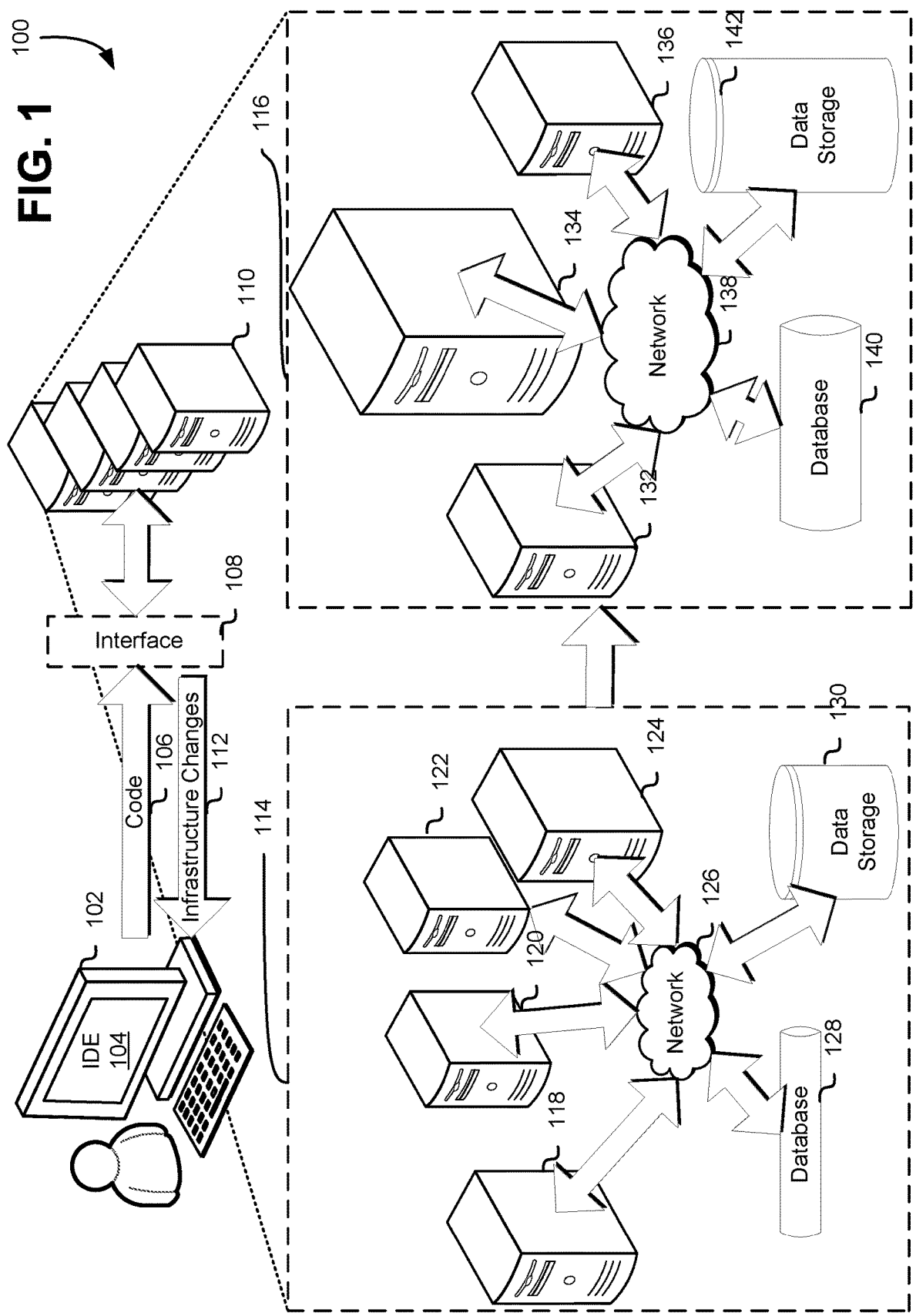
FIG. 1 illustrates an environment in which code changes are used to generate information associated with infrastructure changes, in accordance with one embodiment.

A computing resource service provider implements and/or deploys an interface for providing and generating templates that, when processed by a capable system, cause an infrastructure-level update to the system. The templates are generated from a logged series of changes to an execution environment caused by deployment, development, and/or testing of application code. The interface may be integrated into a development environment provided by and/or operating on either or both the computing resource service provider or an entity outside of the computing resource service provider, such as a remote device connected to the computing resource service provider via a network.

In one embodiment, a development interface, such as an integrated development environment, signals to the interface associated with the computing resource service provider that code being developed, deployed, or otherwise manipulated over a period of time may cause or imply changes to a target execution environment on which the code is being tested or otherwise executed. The interface receives the indication, which may include an identifier or other information enabling the code and associated activity in the execution environment to be tracked in a correlated fashion, and further signals to a monitoring service, such as an audit service provided by the computing resource service provider, to record a log of any changes caused to the infrastructure associated with the execution environment. In one embodiment, the monitoring service uses the identifier or other information to track the infrastructure-level changes caused by the associated code development and disregard other changes to the execution environment, such as infrastructure-level changes caused by maintenance processes, other users of the execution environment, other development and/or application execution events occurring in the execution environment, and the like.

In one embodiment, the development interface signals to the interface associated with the computing resource service provider that the code development, deployment, or other associated activity is complete. The interface causes the monitoring service to stop logging the events in the execution environment and provide the log, which may be in the form of a snapshot of the execution environment for the monitored period of time, to a template generator. The template generator processes the log of changes by determining which infrastructure components were added, modified, or deleted, as well as any dependencies implied by those changes. To the extent that the monitored execution environment differs in configuration and/or syntax relative to that of a targeted execution environment, the template generator translates the changes to analogous changes in the target execution environment so as to allow the deployed/developed/committed code to operate in an equivalent fashion as between the configured infrastructure of the monitored execution environment and that of the target execution environment.

In one embodiment, the template generator generates a template that can be processed by the target execution environment to update the configuration of the target execution environment. The configuration may involve any infrastructure-level configuration, where the infrastructure itself is instantiable, modifiable, and/or definable by executable code. In one embodiment, the template, when processed by an entity associated with the target execution environment, updates operational parameters of virtualized devices associated with the target execution environment to an equivalent state associated with the monitored development environment changes from which the template was generated.

In one embodiment, the template is provided, via the interface of the computing resource service provider, to the development interface. In one embodiment, the interface and/or the development interface provides the processed log of changes so as to enable a user of the development interface to select some, all, or none of the infrastructure-level changes. The selected changes, upon confirmation via the interface, cause generation of the template to include only those selected changes. In one embodiment, the selection is provided via the interface and/or the development interface prior to generation of the template by the template generator, and the selection is received by the template generator to cause generation and eventual provision of the template. In one embodiment, the template containing the entirety of changes determined by the monitoring service is provided via the interface and/or the development interface, and the selection causes, via the interface and/or the development interface, generation of a template containing only the selected changes from the initially received template. In one embodiment, the interface and/or the development interface provides an option to push the template (either the full template, or only selected changes associated therewith) to the target execution environment, so as to cause the target execution environment to process and effectuate the changes.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which code changes are used to generate information associated with infrastructure changes, in accordance with one embodiment.

A computing resource service provider, which, as described in further detail elsewhere herein, provides computing resources in response to requests of an entity, such as a customer device 102 (also interchangeably referred to as a "client device") connected therewith. The computing resource service provider, in one embodiment, implements flexibly configurable computing resources 114, 116, such as virtualized resources, abstracted from "bare metal" hardware resources 110. The computing resource service provider, in one embodiment, implements and/or deploys an interface 108 to transact information to and from a connecting customer device 102 or other entity, such as code 106, infrastructure changes 112, and other information described in further detail herein.

In one embodiment, the customer device 102 executes, provides, displays, or otherwise provides a user of the customer device 102 access to a development interface 104, such as an integrated development environment (illustrated as "IDE"). The computing resource service provider, such as through the aforementioned interface 108, interacts with the development interface 104 via the customer device 102. In one embodiment, the development interface 104 is implemented by computing resources (e.g., 110), of the computing resource service provider, and the customer device 102 accesses the IDE 104 via a network connection with the computing resource service provider.

In one embodiment, the IDE 104 indicates to the interface 108 associated with the computing resource service provider that code 106 being developed, deployed, or otherwise manipulated over a period of time in the IDE 104 may cause or imply changes to a target execution environment on which the code is being tested or otherwise executed. In one embodiment, the IDE 104 provides the code 106 via the interface 108 to the computing resource service provider. In one embodiment, the interface 108 is integrated with the IDE 104 and is implemented by the customer device 102 (e.g., executes thereupon), and the provision of code 106, and/or information related to that code 106, is transacted wholly under the control of the customer device 102. In one embodiment, the interface 108 provides a conduit for information other than the code 106, such as interaction of a service of the computing resource service provider with the IDE 104 and/or an execution environment on which the code 106 operates (which itself may be implemented by the customer device 102). In one embodiment, the execution environment operates as a test environment that has similar execution characteristics to a production environment provided by the computing resource service provider, and one or more services and/or resources provided by the computing resource service provider interacts with the execution environment to determine information associated with the code 106 being deployed, tested, and/or developed.

In one embodiment, the interface 108, or a service and/or capabilities associated with the interface 108 (such as those provided by the computing resource service provider), tracks changes to the execution environment caused by the code being developed, deployed, and/or tested, and, upon determining that the code development, deployment, and/or testing activity is complete, processes the tracked execution environment changes to determine an updated configuration for the computing resources associated with the tracked execution environment. The updated configuration is, in one embodiment, includes infrastructure changes 112 or other data container that, when processed by a target execution environment for which the code is intended to operate (e.g., in a production environment), causes infrastructure of the target execution environment to change in configuration so as to accommodate the execution of the new code 106. Accordingly, in one embodiment, the infrastructure changes 112 are provided via and/or by the interface 108 to the customer device 102, such as via the IDE 104, such that the code 106, when deployed (e.g. by the customer device 102 through the IDE 104) to the target execution environment, is also associated with the infrastructure changes 112. In one embodiment, the code 106 is deployed to the target execution environment in connection with deployment of the infrastructure changes 112.

As mentioned, the computing resource service provider provides, in one embodiment, flexibly configurable computing resources that, from the perspective of a connecting entity, functionally similar to (or identical to) fixed hardware resource infrastructure. The computing resource service provider provides, in one embodiment, one or more services implemented using hardware devices, and providing, to consumers of the various services, infrastructure resources representing various capabilities of those hardware devices, where the actual configuration of such infrastructure resources are variably scalable and configurable relative to the hardware that implements them. In one embodiment, code 106 development, deployment, and/or testing activities result in and/or necessitate infrastructure changes 112 for the implementing resources from a first configuration 114 to a second configuration 116. The changes 112 may entail an increase or decrease in capabilities, functionality, capacity, etc., of existing resources, creation of new resources, deletion/decommissioning of resources, and/or any combination thereof.

As mentioned and illustrated, the computing resource service provider, in one embodiment, provides a heterogeneous "stack" of instantiable resources and/or services associated therewith, such as compute resources 118, 120, 122, 124, network(s) 126, database(s) 128, data storage 130, and the like. A code-related activity, as described herein, may result in infrastructure changes, or generation of a template that is processable by an applicably configured system, to update the configuration to a second configuration 116 where some resources are removed, added, and/or modified relative to the previous configuration. As illustrated, compute resources 132, 136 remain identical in capability, while compute resource 134 is increased in capability relative to that of the first configuration 114. Also as illustrated, the network 138, the database 140, and the data storage 142 may all be increased in capability relative to the previous configuration 114, while one of the compute resources in the first configuration 114 is removed by the infrastructure update 112 in the second configuration 116.

Figure 2:
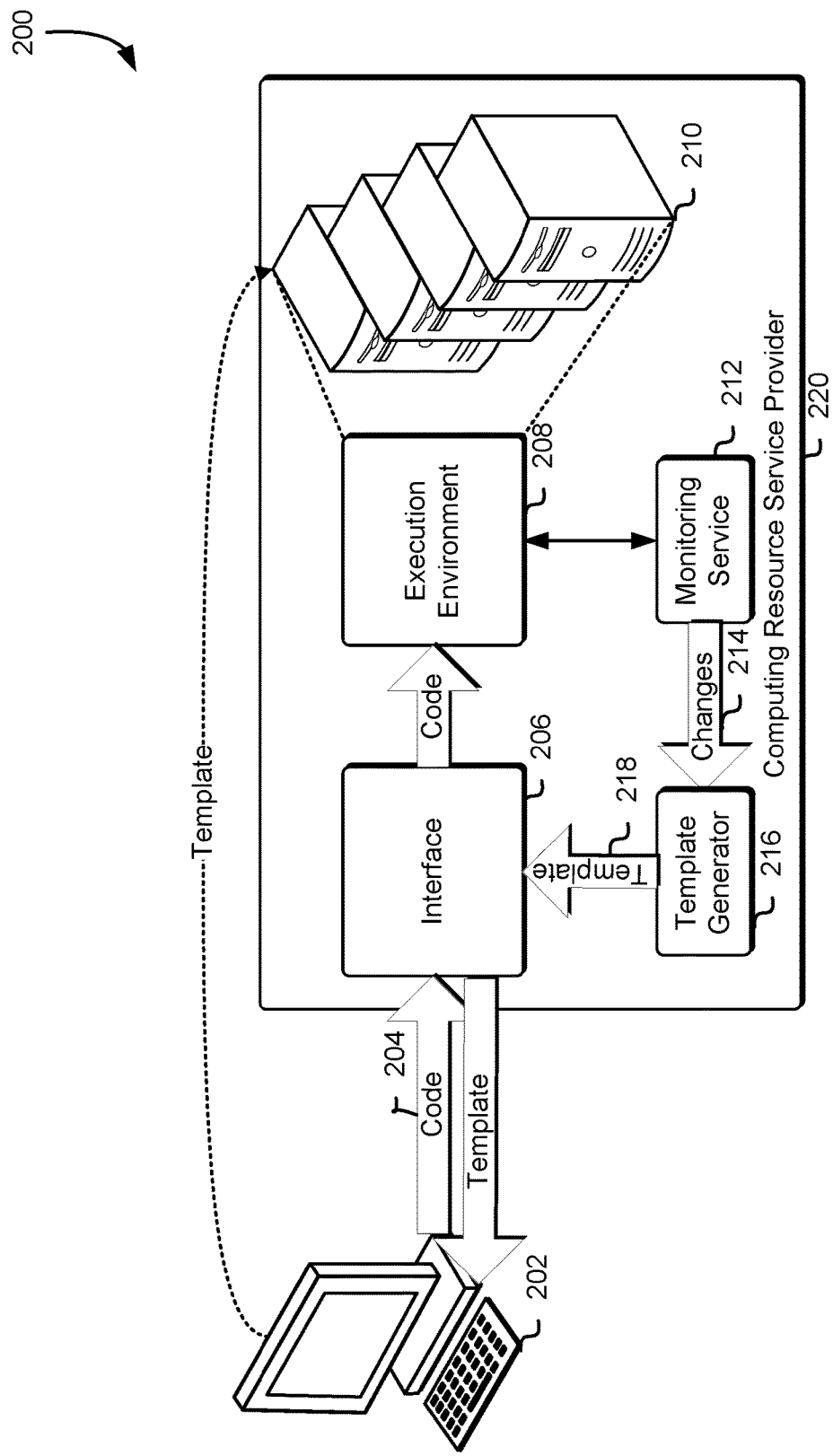
FIG. 2 illustrates an environment that implements a system for tracking and coalescing infrastructure-level changes associated with code development and/or deployment, in accordance with one embodiment.

FIG. 2 illustrates an environment 200 that implements a system for tracking and coalescing infrastructure-level changes associated with code development and/or deployment, in accordance with one embodiment.

As mentioned in connection with FIG. 1 above, a computing resource service provider 220 provides and/or implements components, services, and/or other mechanisms for providing and generating templates 218 based on incident code 204. The templates, when processed by a capable system, such as a computing resource service or related resources 210, cause an infrastructure-level update to the system.

As discussed in connection with FIG. 1, in one embodiment, a development interface, such as an integrated development environment, operates on a device 202. In one embodiment, the development interface operates on the device 202 by executing on the device 202. In one embodiment, the development interface operates as a service or other resource of the computing resource service provider 220, and is made available for access via the client device 202. The client device 202 signals to the interface associated with the computing resource service provider that code 204 being developed, deployed, or otherwise manipulated over a period of time may cause or imply changes to an execution environment 208 on which the code is being tested or otherwise executed. The interface 206 receives the indication, which may include an identifier or other information enabling the code 204 and associated activity in the execution environment 208 to be tracked in a correlated fashion, and further signals to a monitoring service 212, such as an audit service provided by the computing resource service provider 220, to record a log of any changes 214 caused to the infrastructure associated with the execution environment 208.

A client device 202, in one embodiment, connects via a network to one or more services provided by the computing resource service provider 220. In one embodiment, the computing resource service provider 220 provides a distributed, virtualized and/or datacenter environment within which one or more applications, processes, services, virtual machines, and/or other such computer system entities may be executed.

In one embodiment, the command or commands to connect to the computing resource service provider 220 and/or the various data transfer device(s) originates from an outside computer system and/or server, such as the client device 202. In one embodiment, the command(s) originate from an entity, user, or process on a remote network location. In one embodiment, the command(s) originate from an entity, user, or process within the computing resource service provider 220. In one embodiment, the command(s) originate from a user of the client device 202 and/or as a result of an automatic process operating on either/both the client device 202 (such as in the development interface) and/or the computing resource service provider 220. In one embodiment, the command or commands to initiate the connection to the computing resource service provider 220 is sent to the services implemented thereby, without the intervention of a user of the services and/or the client device 202. The command or commands to initiate the connection to the services may originate from the same origin as the command or commands to connect to the computing resource service provider 220, another computer system and/or server, a different entity, user, or process on the same or different remote network location, a different entity, user, or process within the computing resource service provider 220, a different user of the client device 202, and/or any combination thereof.

In one embodiment, the commands are performed using one or more protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

In one embodiment, the commands are signed using a digital signature so as to provide assurance as to the authenticity of the contents and/or provenance of the commands. Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

The client device 202 requests connection to the computing resource service provider 220 via one or more connections and via one or more networks and/or entities associated therewith, such as servers connected to the network, either directly or indirectly. The device that requests access to the service(s), such as the client device 202, may be any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. The network may be a local network, an internal network, a virtual private network, a public network such as the Internet, or other networks such as those listed or described herein. The network operates in accordance with various protocols such as those listed or described herein.

In one embodiment, the computing resource service provider 220 provides access to one or more computing resources as well as provide access to computing services such as virtual machine (VM) instances, automatic scaling groups, databases, data storage services/systems, compute resources, and the like, derived from a heterogeneous or homogeneous combination of those computing resources. In one embodiment, one or more of the services may interact so as to generate and/or provide access to a "stack" of multiple resources, which may be either homogeneous or heterogeneous, that work together as an execution environment. The "stacks" generated are, in one embodiment, coalesced according to one or more requirements of an execution environment, and the execution environment operates thereon. The resources of the given "stack" associated with the execution environment 208 are configurable via one or more application programming interface or other programmatic calls.

In one embodiment, a first service of the computing resource service provider 220, receives an API call to configure the infrastructure (e.g., the "stack"), and, according to that call, initiates one or more API calls to the other resources/services associated with the stack so as to configure the component resources allocated to that "stack." Accordingly, in one embodiment, an update to the configuration generated from code 204 development, deployment, and/or testing is effectuated by an entity, such as a template, that is provided to a receiving resource of the computing resource service provider 220 and processed so as to update an execution environment 208 on which the code 204 is running and/or will run. While one execution environment 208 is illustrated, in one embodiment, the computing resource service provider 220 and/or the client device 202 operate and/or implement multiple execution environments.

In one embodiment, the client device 202 and/or the computing resource service provider 220 operates and/or implements a test execution environment 208 in which the code 204 being monitored, developed, etc., executes, and the changes 214 monitored in that environment result in a template 218 or other information that causes a configuration change to that test execution environment 208, a different execution environment (such as a production execution environment on which the pushed code will eventually run), or both. Similarly, in one embodiment, any of the components shown in FIG. 2 as part of the computing resource service provider 220 may alternatively, or in addition, be implemented and/or executed outside of the computing resource service provider 220, such as on the client device 202. While a single execution environment 208 is pictured in FIG. 2 and elsewhere herein for reasons of clarity, it is contemplated that, in one embodiment, multiple execution environments 208 are monitored. Similarly, in one embodiment, multiple execution environments are the target of the eventual changes resulting therefrom (that is, a given template may be applicable to, and provided to, some or all of a set of multiple production execution environments). In such scenarios, in one embodiment, a given template is adapted and generated so as to be specific to each target environment.

As mentioned, the computing resource service provider 220 provide a variety of services to provide access to computing resource service provider resources 210, to connecting devices such as the client device 202, which in turn communicates with the computing resource service provider 220 via an interface 206, such as a web service interface, application programming interface (API), user interface, or any other type of interface.

The services provided by the computing resource service provider may include, but are not be limited to, a virtual computer system service, a block-level data storage service, a cryptography service, an on-demand data storage service, a notification service, an authentication service, a policy management service, an archival storage service, a durable data storage service, an auditing and/or monitoring service 212, and/or other such services. In one embodiment, each of the services provided by the computing resource service provider 220 includes one or more web service interfaces that enable the customer device 202 to submit appropriately configured API calls to the various services through web service requests. In addition, in one embodiment, each of the services includes one or more service interfaces that enable the services to access each other (e.g., to enable a virtual computer system of the virtual computer system service to store data in or retrieve data from the on-demand data storage service or the data storage service, and/or to access one or more block-level data storage devices provided by the block-level data storage service).

In one embodiment, the monitoring service 212 uses the aforementioned identifier or other information to track the infrastructure-level changes 214 caused by the associated code development and disregard other changes to the execution environment 208, such as infrastructure-level changes caused by maintenance processes, other users of the execution environment, other development and/or application execution events occurring in the execution environment, and the like.

The identifier may be a value, a token (such as a cryptographic token), or other information that is associated with other information, such as the identity of a client device 202, the particular code in question 204, an operator or user of the client device 202, and the like. To the extent that the identifier is attached with the code 204 manipulation operation being tracked, any changes 214 monitored therefrom (e.g., by the monitoring service 212) are also associated with that identifier. In one embodiment, any internal changes to the 208 caused by activities associated with the code 204 are associated with the identifier in connection with those changes being caused to the environment 208. In one embodiment, each API call for service configuration updates (e.g., to the resources of the stack associated with the execution environment 208 being tracked) associated with the code development activity is tagged with the identifier, and the monitoring service 212 uses those associations, at least in part, to generate the log of changes 214.

The monitoring service 212 is, in one embodiment, a service of the computing resource service provider that tracks changes to configuration of other resources and services. The monitoring service 212, as with other services provided by the computing resource service provider 220, is implemented using one or more computing resources of the provider 220, and is available to other services thereof and/or the client device 202 via an interface. Similarly, the template generator 216 is, in one embodiment, also a service of the computing resource service provider 220 that processes data received from the monitoring service 212 (and/or other entities), so as to generate different data (e.g., a template) usable by a downstream recipient to effectuate one or more configuration changes to an associated set of resources, such as a stack associated with an execution environment. The template 218 itself is, in one embodiment, a file or other data container, in a format that is capable of being processed by the receiving interface and/or entity associated with the target execution environment for the code 204. In one embodiment, the template itself includes executable code (i.e., executable upon or via the receiving entity).

As mentioned, the templates 216 are generated from a logged series of changes 214 to the execution environment 208 caused by deployment, development, and/or testing of the application code 204. In one embodiment, the development interface signals to the interface 206 associated with the computing resource service provider 220 that the code development, deployment, or other associated activity is complete. The interface 206 causes the monitoring service 212 to stop logging the events in the monitored execution environment 208 and provide the log, which may be in the form of a snapshot of the execution environment 208 for the monitored period of time, to a template generator 216.

The template generator 216 processes the log of changes by determining which infrastructure components (e.g., stack components) were added, modified, or deleted, as well as any dependencies implied by those changes. To the extent that the monitored execution environment 208 differs in configuration and/or syntax relative to that of a targeted execution environment (such as a different production execution environment), the template generator 216 translates the changes to analogous changes in the target execution environment so as to allow the deployed/developed/committed code to operate in an equivalent fashion as between the configured infrastructure of the monitored execution environment and that of the target execution environment.

In one embodiment, the template generator 216 generates a template that can be processed by the target execution environment to update the configuration of the target execution environment. The configuration may involve any infrastructure-level configuration, where the infrastructure itself is instantiable, modifiable, and/or definable by executable code. In one embodiment, the template, when processed by an entity associated with the target execution environment, updates operational parameters of virtualized devices associated with the target execution environment to an equivalent state associated with the monitored development environment changes from which the template 218 was generated.

In one embodiment, the template 218 is provided by the template generator 216 to the interface 206, which then provides the template, or a portion thereof to the client device 202. In one embodiment, the template 218 containing all the changes 214 is provided to the client device 202 via an associated development interface operating on the client device 202. In one embodiment, prior to the template 218 being generated by the template generator 216, a list of the changes 214 is provided by the interface 206 (e.g., via the monitoring service 212) to the client device 202, such as via a development interface associated with the client device 202, whereupon a selection comprising a subset of those changes is performed by the client device 202, such as by a user of the client device 202. The selection is conveyed by the client device 202 to the interface 206, which in turn provides the selection to the template generator 216, causing the template generator 216 to generate a template that includes only the selected changes. The template is then provided via the interface 206 to the client device 202. In one embodiment, the full generated template 218 including all changes 214 is provided to the client device 202, and a facility of the client device 202 itself processes the template to provide a selection of the changes associated with that template 218. Any modification or selection from amongst those changes is processed locally to the client device 202, and the template is modified accordingly.

Figure 3:
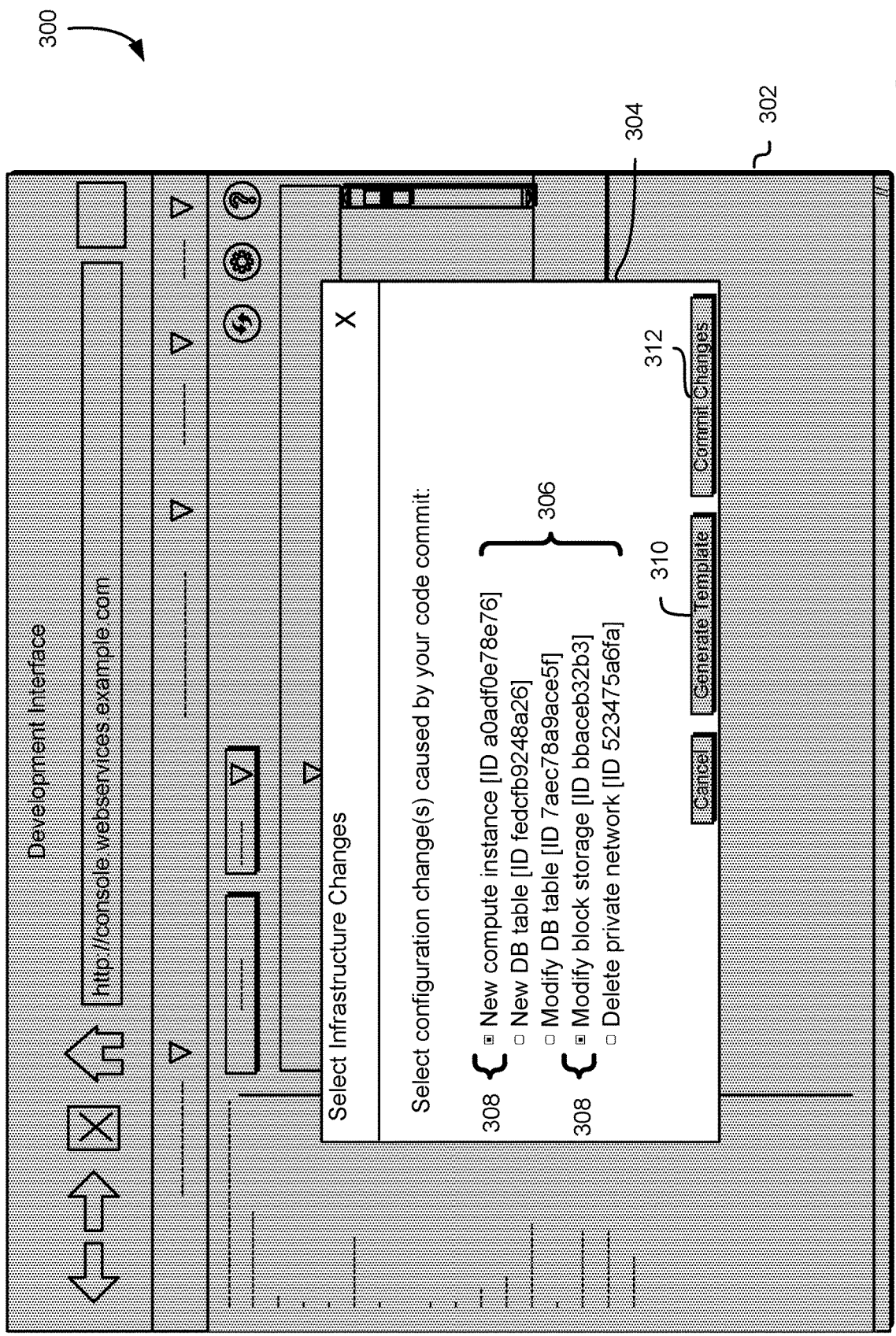
FIG. 3 illustrates an interface that provides a selection for infrastructure-level changes associated with code commits, in accordance with one embodiment.

FIG. 3 illustrates an interface 300 that provides a selection for infrastructure-level changes associated with code commits, in accordance with one embodiment.

In one embodiment, as mentioned in connection with at least FIGS. 1 and 2, the template is provided, via the interface of the computing resource service provider, to the development interface 302 so as to cause display of the associated changes associated with the template within the development interface 302. In one embodiment, as mentioned, the interface and/or the development interface 302 provides the processed log of changes so as to enable a user of the development interface to select some, all, or none of the infrastructure-level changes.

As illustrated in FIG. 3, in one embodiment, the changes are presented in graphical form. However, in one embodiment, such interchanges between the development interface 302 and the interface are programmatic, instead of graphical. In one embodiment, as mentioned, the interchange between the development interface 302 and the interface is an application programming interface (API) call, a web service call, or a command line interface (CLI) command). In one embodiment, the interchange is heterogeneous (i.e., comprises communications involving a combination of graphical and programmatic interactions, and/or programmatic interactions of different types). While FIG. 3 illustrates a graphical user interface in which the interface is exposed, in one embodiment, the interface is generally made available for use not only in the context of a development interface (such as an IDE), but also with other points of entry, such as through direct interaction via a CLI, an API call, a web service call, and the like.

In one embodiment, the totality of tracked/logged changes 306 is provided in a dialog 304, such as a modal window, of the graphical user interface of the development interface. As illustrated, a user of the graphical user interface dialog 304 selects one or more of the associated changes 308 and is provided with the option to generate a template 310 that, as previously discussed, effectuates only the selected changes upon being provided to a system capable of processing the template. In one embodiment, the template is thereupon provided, e.g., for download or retrieval, upon a command to generate the template, for later use and/or association (such as with an associated deployment of the developed code to a target execution environment). The selected changes, upon confirmation via the interface, cause generation of the template to include only those selected changes.

As mentioned, in one embodiment, the selection is provided via the interface and/or the development interface prior to generation of the template by the template generator, and the selection is received by the template generator to cause generation and eventual provision of the template. In one embodiment, the template containing the entirety of changes determined by the monitoring service is provided via the interface and/or the development interface, and the selection causes, via the interface and/or the development interface, generation of a template containing only the selected changes from the initially received template.

In one embodiment, the interface and/or the development interface provides an option to push the template and commit changes 312 (either the full template, or only selected changes associated therewith) to the target execution environment, so as to cause the target execution environment to process and effectuate the changes without further intervention from the user of the development interface. In one embodiment, the dialog 304 is not displayed unless specified by the user of the development interface, and the aforementioned logged changes and associated template generated from those changes are pushed to the target execution environment in connection with the indication that code development (e.g., the monitoring period for the monitored execution environment) has completed.

Figure 4:
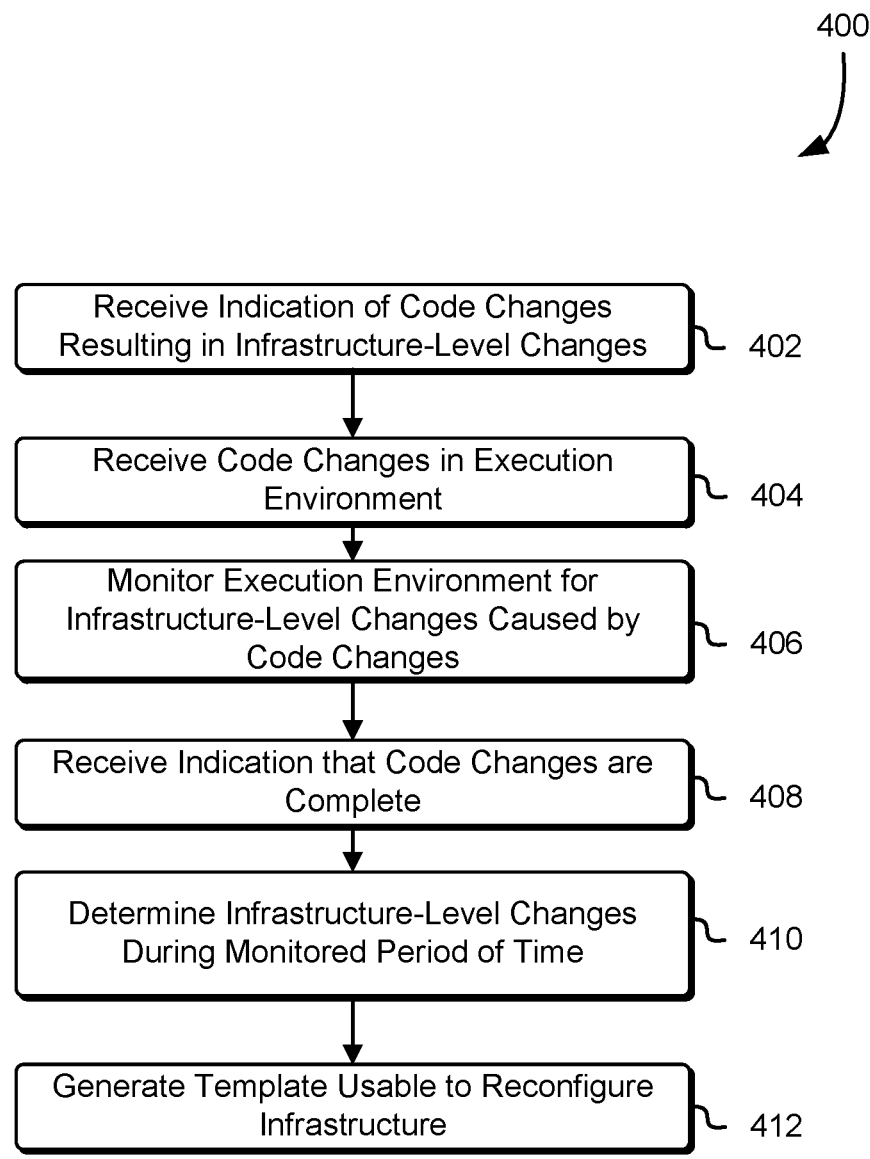
FIG. 4 illustrates a process for generating a template usable to update infrastructure configuration from code changes, in accordance with one embodiment.

FIG. 4 illustrates a process 400 for generating a template usable to update infrastructure configuration from code changes, in accordance with one embodiment.

At step 402, an entity, such as an interface of a computing resource service provider, receives an indication (such as from a development interface of a connecting client device) that a code-related activity, such as deployment, testing, and/or development, may result in changes to infrastructure operating a given execution environment associated with the activity.

At step 404, the execution environment receives and/or processes the associated code changes, and at step 406, a service of the computing resource service provider, such as a monitoring service or audit service for the infrastructure, initiates monitoring of the execution environment to determine which, if any, infrastructure components are being modified, updated, removed, and/or added as a result of the activity. Here and in other illustrated processes, the particular steps are not necessarily executed in the order in which they are presented herein. In one embodiment, the service mentioned in step 406 initiates the monitoring independently (e.g., asynchronously) from any code changes presented to, or processed by, the monitored execution environment in step 404. As previously mentioned, an identifier may be mapped to the activity as well as any changes so as to facilitate determination of which changes are associated with the code activity as opposed to other activities and processes.

At step 408, the interface receives, from the development interface, an indication that the code activity is complete, and at step 410, the interface causes the monitoring service to cease monitoring and provide a log of changes during the monitored period of time to a template generator so as to cause the template generator to generate a template at step 412. The template, as mentioned, is usable by an appropriately configured system associated with the target execution interface, to effectuate one or more updates to the configuration thereof, such as capabilities, interconnections, device types associated with the stack, and the like.

Figure 5:
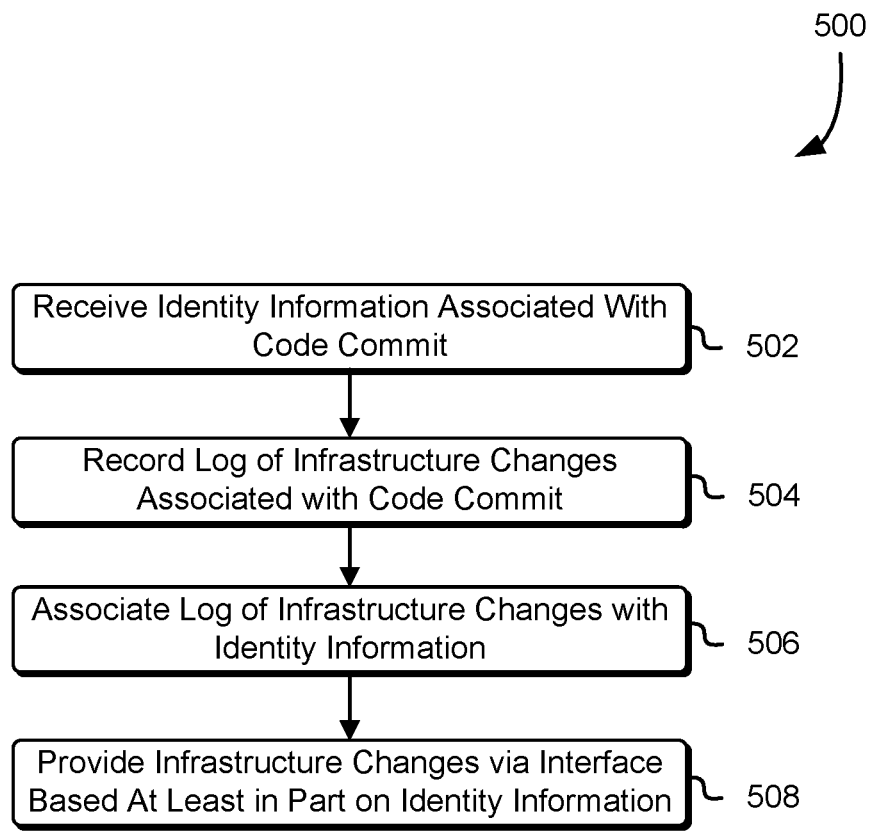
FIG. 5 illustrates a process for associating an identity with a code commit and an associated log of infrastructure-level changes implied or caused by the commit, in accordance with one embodiment.

FIG. 5 illustrates a process 500 for associating an identity with a code commit and an associated log of infrastructure-level changes implied or caused by the commit, in accordance with one embodiment.

At step 502, an entity, such as an interface of the computing resource service provider, receives information related to a code activity (e.g., a commit of the code). The information may include identity information associated with the code activity, such as an identifier for the code activity and/or the user of the device submitting the request. The identity information is, in one embodiment, generated based on a session identification for the code activity, and is generated by the providing development interface (e.g., the IDE).

In connection with receiving the aforementioned identity information in step 502, at step 504, a monitoring service records a log of any and all infrastructure changes to the monitored execution environment associated with the code commit. As previously mentioned, the identity information is used, in one embodiment, to track only the changes associated with the code-related activity and disregard other changes from other activities.

At step 506, the generated log is associated with the identity information by the monitoring service, and at step 508, the changes are provided in accordance with the process described in connection with at least FIG. 4 above via the aforementioned interface. As mentioned in connection with FIG. 4, the changes may be processed by a template generator to generate a template usable by an entity associated with a target execution environment for the code associated with the monitoring, and the changes provided in step 508 are provided via the interface to the requestor with which the identity information is associated.

Figure 6:
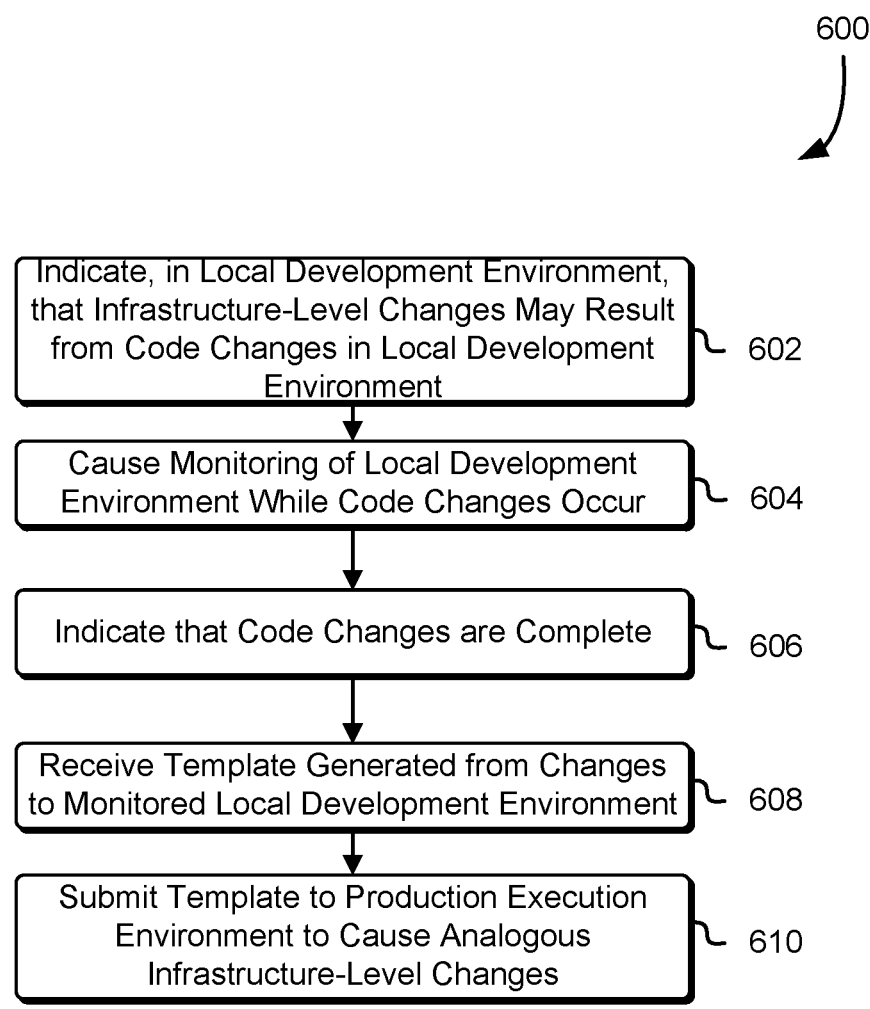
FIG. 6 illustrates a process for initiating generation of an infrastructure update template, in accordance with one embodiment.

FIG. 6 illustrates a process 600 for initiating generation of an infrastructure update template, in accordance with one embodiment.

At step 602, a client device indicates, via a development environment (e.g., development interface) operating locally on the client device, that code activity associated with the development environment may result in (or require, to properly operate) infrastructure-level changes for a target execution environment on which the code will execute. The indication may be provided by the client device to an interface of a computing resource service provider that provides various services, such as monitoring services and template generation services. A user of the client device may cause the aforementioned indication by selecting or flagging a given code activity within the development environment as potentially touching infrastructure-related configuration.

At step 604, the indication provided in step 602 causes the computing resource service provider or other entity implementing the monitoring service to monitor the local execution environment used for code development while the code activity is taking place within that execution environment. In one embodiment, the monitoring service is provided by the computing resource service provider and interacts with a development execution environment operating outside of the computing resource service provider's resources, such as on the client device mentioned in connection with step 602.

At step 606, the client device indicates, in a similar fashion as in step 602, that the aforementioned code-related activity is complete. In one embodiment, the indication causes the monitoring service to cease monitoring the execution environment and process any recorded changes into a log of such changes. In one embodiment, the log of changes includes only changes associated with the code activity, rather than other changes associated with other activities. In one embodiment, the log of changes is processed by a template generator to generate a template in a fashion previously discussed.

At step 608, the generated template is received, from the interface, by the local development environment. In one embodiment, as discussed in further detail in connection with at least FIGS. 3 and 7, the local development environment further provides an opportunity for selection of a subset of the tracked changes associated with the template, so as to generate a different template having only the selected subset of changes.

At step 610, the template is submitted to a production execution environment so as to cause that environment to update the configuration of its infrastructure in accordance with the selected changes. In one embodiment, the production execution environment will then have execution properties compatible with the code associated with the activity that generated the template.

Figure 7:
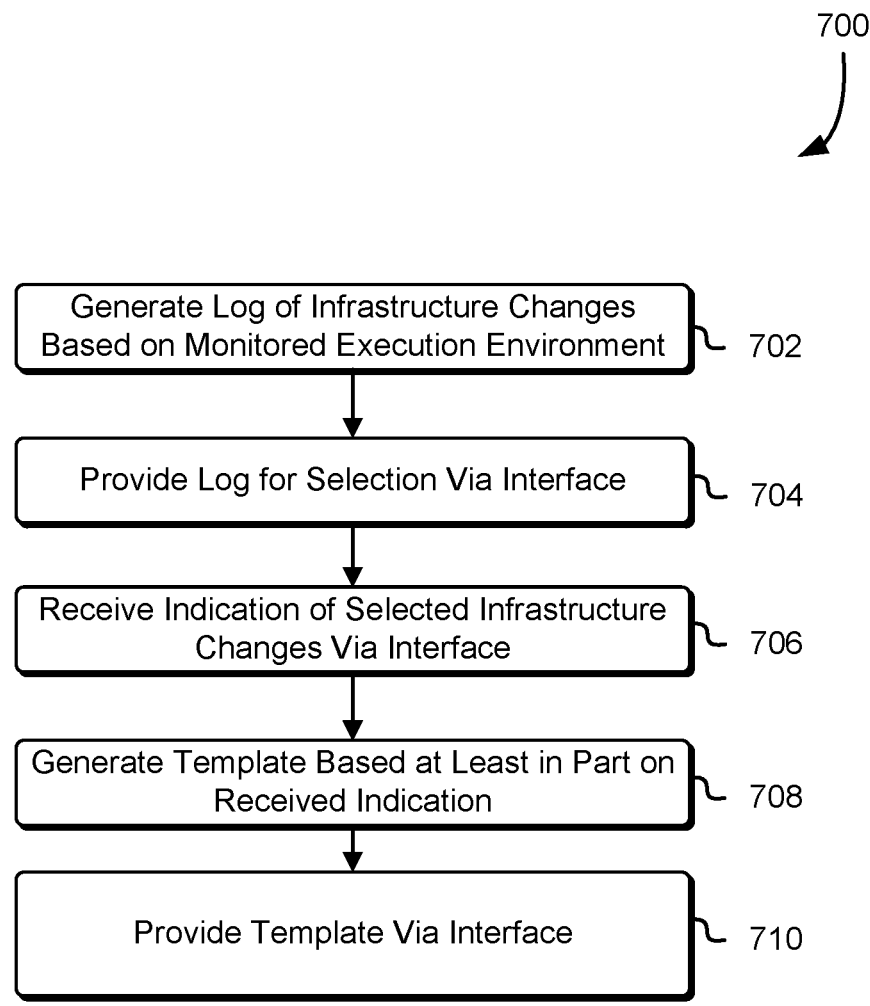
FIG. 7 illustrates a process for logging changes to infrastructure for provision of an infrastructure update template, in accordance with one embodiment.

FIG. 7 illustrates a process 700 for logging changes to infrastructure for provision of an infrastructure update template, in accordance with one embodiment.

At step 702, a log of infrastructure changes associated with a code activity is monitored, tracked, and generated, such as by one or more services of a computing resource service provider, in accordance with techniques discussed in connection with FIGS. 1-6.

At step 704, the log of tracked changes is provided to a recipient interface, such as a development interface operating on or otherwise made accessible by a client device, via a different interface, such as that of a computing resource service provider that performed the monitoring, tracking, and/or generating of the infrastructure changes associated with the code activity. The development interface may provide a list of such changes for selection by a user of the development interface. In one embodiment, the recipient interface is integrated into the development interface, and provides information directly to a user of the development interface without first being processed by the development interface.

At step 706, the interface through which the log was provided at step 702 receives an indication, such as by the development interface, of a selection of some or all of the changes, and at step 708, uses this selection to generate a template that is executable or otherwise capable of being processed by a target execution environment to effectuate the selected infrastructure changes. At step 710, the interface provides the template. In one embodiment, the interface provides the template to the client device associated with the development environment. In one embodiment, the interface provides the template to the target execution environment to directly cause the infrastructure update. In one embodiment, the recipient of the template is selected by the client device (e.g., at the direction of a user of the device).

Figure 8:
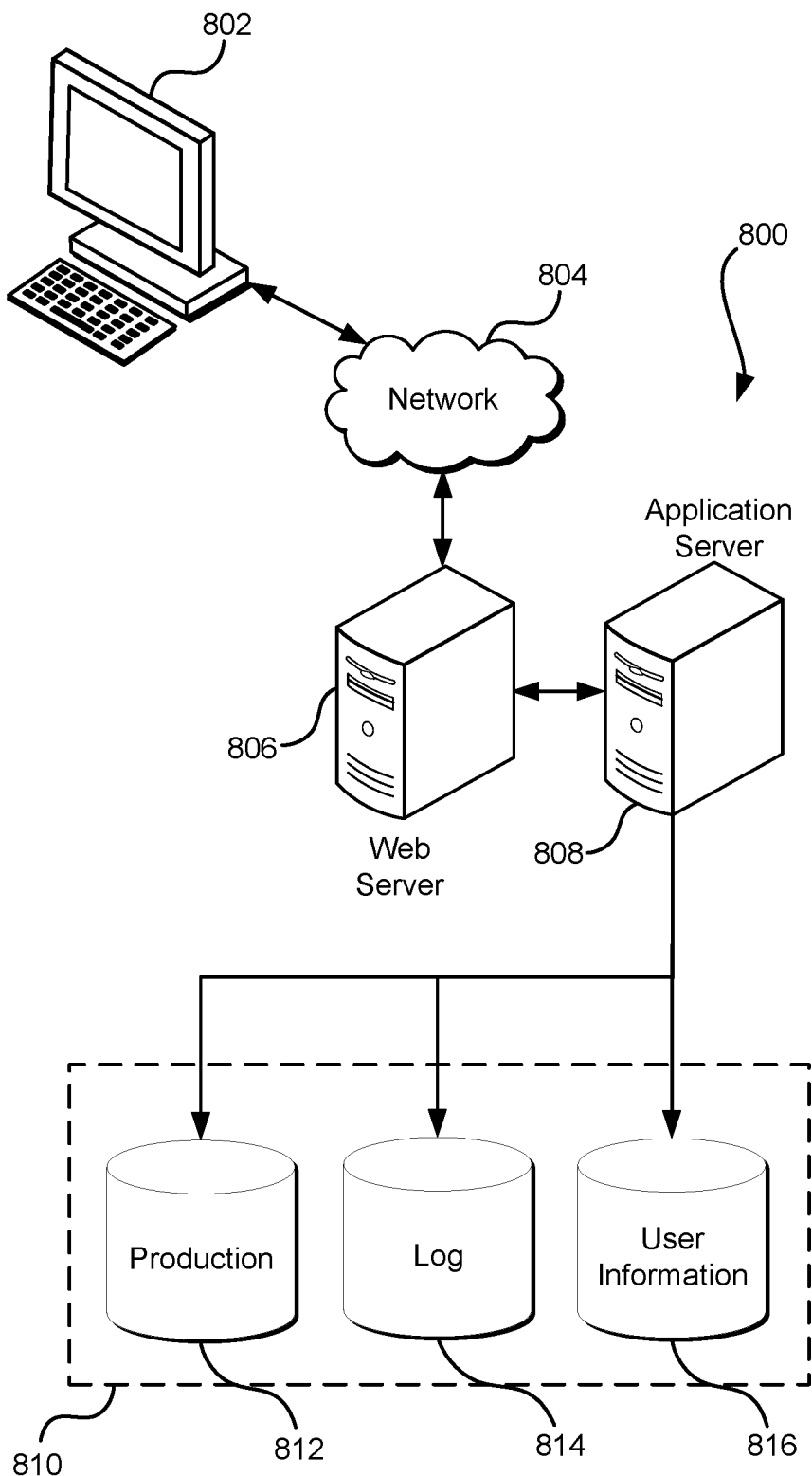
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, via an interface associated with a computing resource, at least a first update to computer-executable instructions operating on the computing resource and an identifier associated with the computing resource and the first update;
   determining, based at least in part on the identifier and running the computer-executable instructions of the first update, a second update that, as a result of being processed by the computing resource, updates the computing resource to a configuration specified in the second update;
   obtaining, via the interface, information associated with the configuration; and
   generating, based at least in part on the second update and the information, a third update.

2. The computer-implemented method of claim 1, further comprising causing the set of resources to process the third update.

3. The computer-implemented method of claim 1, further comprising providing the third update via the interface.

4. The computer-implemented method of claim 1 wherein:
   the configuration defines associations and capabilities of a plurality of virtualized computing resources instantiated using at least the computing resource; and
   the second update includes executable instructions that, as a result of being executed by the computing resource, alters an instantiation of the computing resource relative to a previous configuration.

5. A system, comprising:
   one or more processors; and
   memory that stores computer-executable instructions that, if executed, cause the one or more processors to:
      generate an interface that obtains updates to executable instructions operating on a computing resource associated with the system;
      obtain, via the interface, at least a first update to the executable instructions and an identifier associated with the computing resource and the first update;
      generate, based at least in part on the identifier and the first update, a new configuration for the computing resource that differs from a previous configuration associated with a current operational state of the computing resource;
      provide the new configuration via the interface;
      obtain, via the interface, information associated with the new configuration; and
      generate, based at least in part on the new configuration and the information, an updated configuration.

6. The system of claim 5, wherein the updated configuration is a template that, as a result of being processed by the computing resource, updates a configuration of one or more devices of the computing resource.

7. The system of claim 6, wherein the one or more devices are virtualized devices instantiated from hardware devices of the computing resource.

8. The system of claim 5, wherein the instructions further cause the one or more processors to provide the updated configuration via the interface.

9. The system of claim 5, wherein the instructions further cause the one or more processors to provide the updated configuration to the set of resources.

10. The system of claim 5, wherein the interface interacts with a development environment operating on a different system.

11. The system of claim 5, wherein the instructions further cause the one or more processors to provide, via the interface, one or more components of the new configuration for selection.

12. The system of claim 11, wherein the information includes a selected subset of the one or more components.

13. A non-transitory computer-readable storage medium comprising executable instructions that, as a result of being executed by one or more processors of a computer system, cause the computer system to at least:
   obtain, via an interface of the computer system, updates to executable instructions operating on a computing resource associated with the computer system;
   determine, via the interface, a change to a configuration of the computing resource associated with the updates;
   provide information associated with the change via the interface;
   obtain, via the interface, a subset of the information; and
   generate, based at least in part on the subset of the information, an updated configuration for the computing resource.

14. The non-transitory computer-readable storage medium of claim 13, wherein the updated configuration is a template usable by the computing resource to modify an operation of one or more devices of the computing resource.

15. The non-transitory computer-readable storage medium of claim 14, wherein the template includes code executable by a processor associated with the computing resource to update other code that, if executed by the processor, defines the operation of the one or more devices.

16. The non-transitory computer-readable storage medium of claim 13, wherein the interface is an application programming interface.

17. The non-transitory computer-readable storage medium of claim 13, wherein the interface is a graphical user interface.

18. The non-transitory computer-readable storage medium of claim 13, wherein the interface is associated with an integrated development environment.

19. The non-transitory computer-readable storage medium of claim 13, wherein the interface is associated with a software development kit.

20. The non-transitory computer-readable storage medium of claim 13, wherein the change is determined by a monitoring service associated with the computing resource.

\* \* \* \* \*